Oct. 13, 1953  A. V. L. C. DEBRIE  2,655,334
VERTICALLY ADJUSTABLE SUPPORTING DEVICE
Filed July 1, 1950

Inventor
André Victor Jean Clement
Debrie
by Lindall & Johns

Patented Oct. 13, 1953

2,655,334

UNITED STATES PATENT OFFICE 2,655,334

VERTICALLY ADJUSTABLE SUPPORTING DEVICE

André Victor Leon Clement Debrie, Paris, France

Application July 1, 1950, Serial No. 171,694
In France April 11, 1950

5 Claims. (Cl. 248—157)

It is known in vertically adjustable or movable objects or apparatus, for instance a photographic camera for the reproduction of documents, to make the handling easier by balancing the weight by means of a mass of same value. It is also known to balance this weight by using a spring acting in the direction of movement. The device which forms the object of this invention is characterised by the fact that it utilizes one or more helical springs the force of which is directed at right angles to the direction of motion imparted to the device, through the medium of a reversible-pitch screw-and-nut system adapted to either follow or counteract the circular motion of at least one pinion actuating at least one toothed rack so as to compensate approximately both its weight and that of the object coupled thereto. The reversible-pitch nut is prevented from rotating in the supporting member by a pin extending from the nut and formed with an index movable along a graduation carried by the supporting member so as to indicate, in the case of a photographic camera, the reduction ratio used.

This and other objects of the invention will best be understood from the following description of one illustrative example of the invention, shown diagrammatically in the accompanying drawing and referring to the particular case of a supporting member for a camera for the photographic reproduction of documents which is movable vertically along a pair of vertical guiding pillars.

In the drawing.

In the different figures of the drawing similar parts are designated by the same reference numbers.

Figure 1:
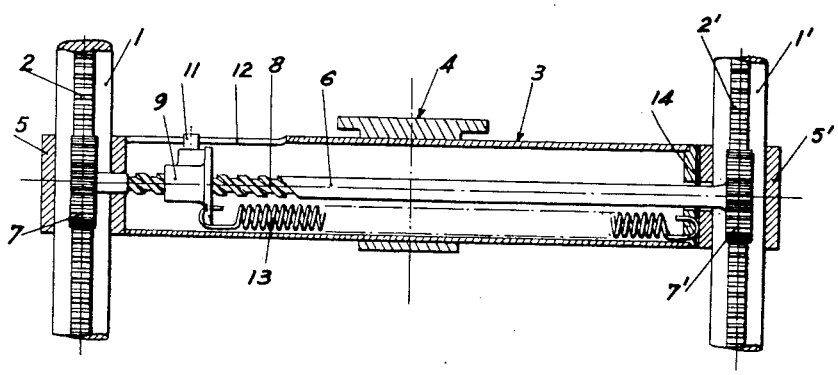
Fig. 1 is an elevational section showing the supporting cross member movable vertically along the pillars.
Figure 2:
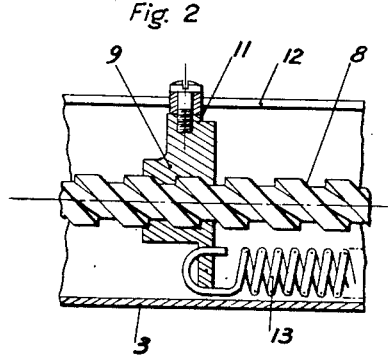
Fig. 2 is a fragmentary elevational section illustrating the tubular cross member and the reversible screw and nut assembly.
Figure 3:
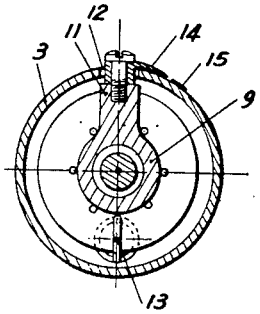
Fig. 3 is a cross sectional view thereof.
Figure 4:
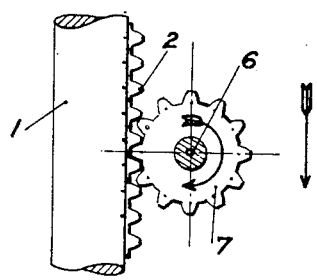
Fig. 4 is a fragmentary side elevation showing one pinion meshing with the cooperating pillar rack.

In the drawing, the arrangement shown comprises a pair of pillars 1, 1' extending vertically and carrying toothed racks 2, 2', respectively.

A movable cross member 3 formed with a supporting portion 4 for the camera (not shown) is movable vertically and guided through means not shown along racks 2, 2'.

The cross member 3 has a tubular cross-section and the supporting portion 4 thereof has a flat top on which the camera is fixed for permitting the latter to be moved vertically along pillars 1, 1' to the required distance from the table (not shown) supporting the documents to be reproduced, whereby the different reduction ratios are obtained.

The cross member 3 consists of a metal tube having at each end a collar 5, 5' respectively, adapted for sliding engagement with and along pillars 1, 1' and around racks 2, 2'. Clamping means of known type (not shown) are provided on these collars so that the latter may act both as locking or guiding means to the cross member.

Internally of cross member 3 is journaled a shaft 6 having fixed at its ends toothed pinions 7, 7', respectively, meshing with racks 2, 2' whereby the cross member 3 may be suitably driven vertically and parallel to itself.

Shaft 6 is formed with a reversible screw thread 8 engaged by a nut 9 provided with a pin 11 engaged through a slot 12 formed in the surrounding tube 3. Nut 9 is thus prevented from moving angularly and when shaft 6 is rotated owing to rolling of pinions 7, 7' on racks 2, 2', respectively, the nut is moved in the axial direction of the shaft.

One or a plurality of helical springs 13 are disposed within the tube 3 and parallel with shaft 6. These springs are fixed by one end to nut 9 and by the other end to one bottom 14 of the tube. During the vertical displacements of the camera the pinions roll on the racks and cause the nut to move axially along the screw. As a consequence of this movement the tension of the springs is modified and yet kept constantly to a value adapted to produce a torque which, transmitted from shaft 6 to pinions 7, 7', will compensate sufficiently, through their action on racks 2, 2', the weight of the support and camera fixed thereon.

This force of course remains slightly below the value which is theoretically required so that the difference is constantly lower than the frictional forces developed between movable parts, whereby the displacement requires only a small effort from the operator while the device left to itself will remain in its position automatically.

An index 14 fixed on pin 11 moves therewith along a graduation 15 carried by cross member 3 and makes it possible to read at a glance the reproduction ratio corresponding to each vertical position of the support.

What I claim is:

1. A cross member device, photographic camera support or other device adapted for vertical sliding motion along a pair of guiding pillars, comprising a pair of pinions fixed at both ends of a horizontal shaft journaled in said support, said pinions rolling in meshing engagement with a pair of cooperating toothed racks respectively, each rack being fixed on one of said guiding pillars, said shaft having formed thereon a reversible screw thread engaging a nut mounted thereon for axial movement therealong and formed with a pin extending through a longitudinal slot in said cross member device or support, said nut being constantly urged by at least one spring member toward one end of said support, whereby this spring action will engender a torque on said screw tending to rotate said pinions and such as to constantly counterbalance the weight of both the cross member device or support and objects carried or supported thereon, so that its displacement may be effected by the operator through the application of but a very low force while the frictional stresses developed are sufficient to cause the support, when left in any desired vertical position, to be held automatically in this position due to the combined spring- and frictional actions produced.

2. A supporting device according to claim 1 applicable more particularly to variable ratio cameras for the reproduction of documents, wherein the nut, actuated by the pinions rolling in meshing engagement on said racks which cause the reversible screw to rotate in said nut, carries an index member movable along a graduation provided on said cross member to indicate the reduction ratio corresponding to the scaled positions of said index.

3. An adjustable supporting device comprising, in combination, elongated rack means; a support mounted on said rack means for movement therealong; a threaded, elongated shaft mounted, for rotation about its axis, on said support and extending normal to said rack means; pinion means fixedly mounted on said shaft for rotation therewith and meshing with said rack means; nut means located on and engaging said threaded shaft, said nut means being mounted on said support only for translational movement along the axis of said shaft; and spring means operatively connected to said support and nut means for urging the latter in one direction along said shaft so as to thereby compensate for the weight of an object carried by said support for movement therewith along said rack means.

4. An adjustable supporting device comprising, in combination, an elongated toothed rack; an elongated threaded shaft mounted for rotation about its axis and extending normal to said rack; gear means interconnecting said rack and shaft means for rotating the latter about its axis as said shaft means moves along said rack; nut means located on and engaging said threaded shaft; guide means operatively connected to said rack and said nut means to guide the latter only for translational movement along the axis of said shaft; and spring means operatively connected to said guide means and nut means for urging the latter in one direction along the axis of said shaft so as to thereby counterbalance the weight of an object supported on said shaft.

5. An adjustable supporting device comprising, in combination, an elongated bar having rack teeth extending along the length thereof; an elongated tube mounted adjacent one end thereof on said bar for sliding movement thereon and extending normal to said bar, said tube being formed with an elongated slot passing through the wall thereof and extending along the length thereof; an elongated threaded shaft mounted for rotation in said tube; a pinion fixedly mounted on said shaft for rotation therewith and engaging said rack teeth; a nut located on and engaging said threaded shaft, said nut having a projection extending through said slot in said tube so that said nut moves only in translation along the axis of said shaft; and elongated spring means fixedly connected at one end thereof to said nut and at the other end thereof to said tube for urging said nut in one direction along the axis of said shaft, whereby said spring means may counterbalance the weight of an object supported on said tube.

ANDRÉ VICTOR LEON
CLEMENT DEBRIE.

References Cited in the file of this patent

UNITED STATES PATENTS

| Number | Name | Date |
|---|---|---|
| 2,119,710 | Holder | June 7, 1938 |
| 2,151,191 | Crane et al. | Mar. 21, 1939 |
| 2,302,134 | McNabb | Nov. 17, 1942 |
| 2,512,714 | Carlzen | June 27, 1950 |